June 20, 1950          J. A. CHISHOLM          2,512,142
TRAILER

Filed March 13, 1946                       2 Sheets-Sheet 1

Inventor
John A. Chisholm
By Ralph Hammar
Attorney

June 20, 1950  J. A. CHISHOLM  2,512,142
TRAILER

Filed March 13, 1946  2 Sheets-Sheet 2

Inventor
John A. Chisholm
By Ralph Hammar
Attorney

Patented June 20, 1950

2,512,142

UNITED STATES PATENT OFFICE 2,512,142

TRAILER

John A. Chisholm, Erie, Pa.

Application March 13, 1946, Serial No. 654,066

2 Claims. (Cl. 280—33.44)

1

The conventional trailer hitch may, depending upon the weight distribution of the trailer and its load, transmit a considerable part of the total weight of the trailer to the rear frame of the towing automobile. This invention is intended to decrease the transmitted weight without interfering with, and in fact improving, the stability of the trailer through the use of an auxiliary wheel carrying part of the load which would otherwise be transmitted through the hitch. One feature is the use of a mounting for the wheel comprising a circle of larger diameter than the wheel so the wheel can project up through the mounting circle. This permits the use of a full size wheel which is better adapted to road shocks. Further objects and advantages appear in the specification and claims.

Figure 1:
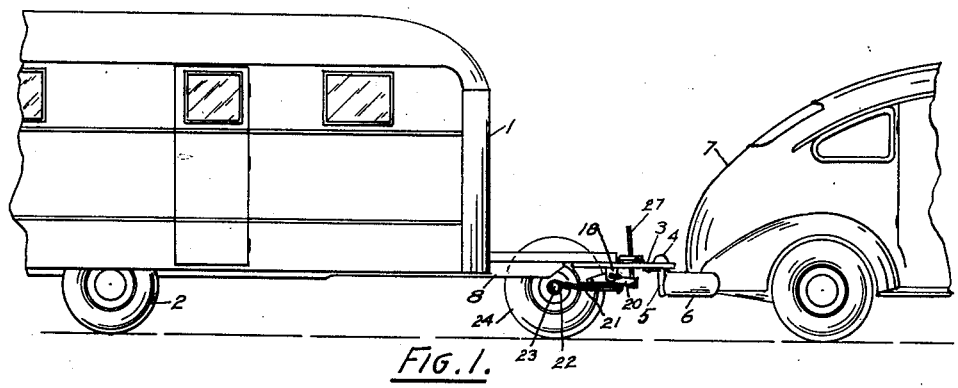
Figure 2:
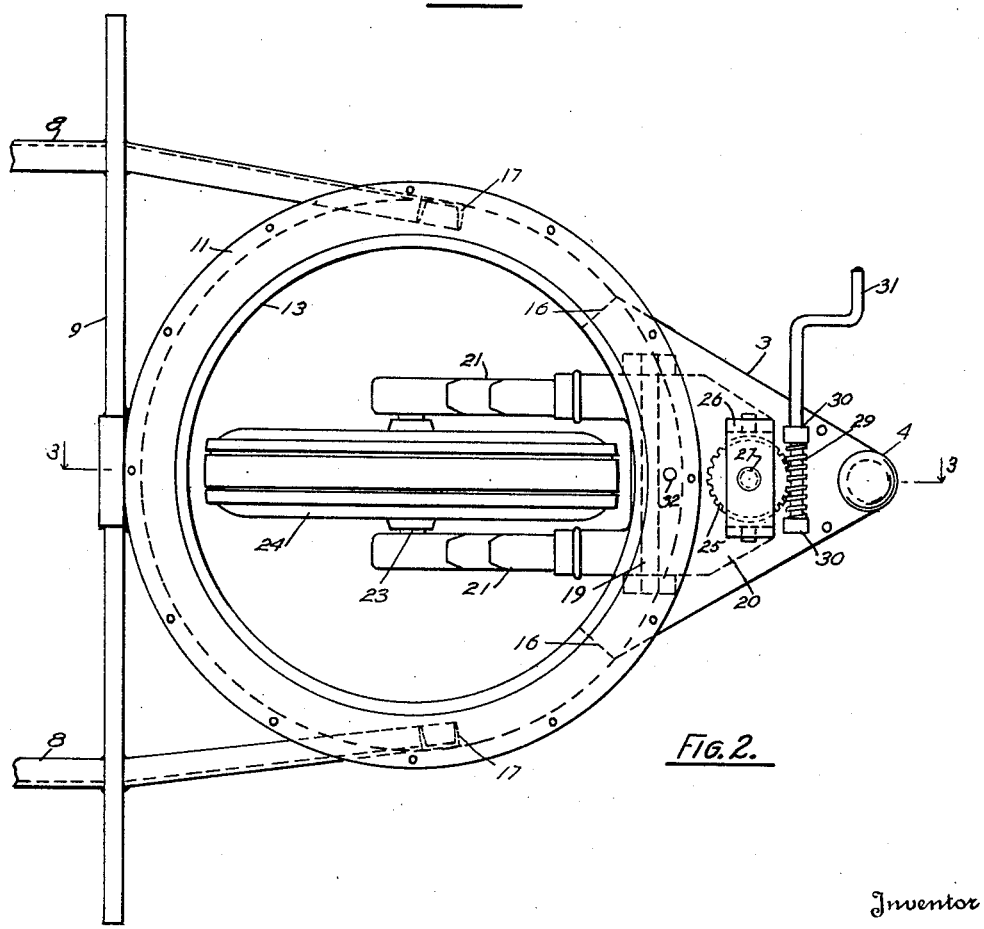

In the drawings, Fig. 1 is a side view of a trailer hitched to an automobile; Fig. 2 is a top plan view of the auxiliary wheel associated with the trailer hitch; and Fig. 3 is a section on line 3—3 of Fig. 2.

Referring to the drawings, there is shown a trailer body 1 supported by rear wheels 2 and having at its front end a hitch 3 having a ball joint member 4 for connection to a complementary joint member 5 on the rear bumper 6 of an automobile 7. It is desirable that part of the weight of the trailer be transmitted through the ball joint 4, 5 to the towing automobile although the automobile frame or rear springs may not be strong enough to take the desired part of the trailer load. It is undesirable that the trailer apply an upward force at the ball joint 4, 5. Since the weight distribution of the trailer is controlled to a considerable extent by the amount and distribution of the load, under some conditions an objectionable weight is transmitted to the rear frame and springs of the towing automobile. In the present invention the weight at the front end of the trailer is divided between the hitch and a full sized wheel so that under no condition is an objectionable amount of the weight transmitted to the towing automobile.

The invention is shown applied to a trailer having a frame of conventional construction comprising channel shaped side members 8 extending substantially the full length of the body and channel shaped cross members 9 supporting the body. At the front end of the trailer the side members 8 are bent inward and welded to the under side of a guide circle 10. Spaced above the circle 10 is an identical guide circle 11 which provides an annular guide groove 12 receiving the outer edge of an inner guide circle 13. The

Figure 3:
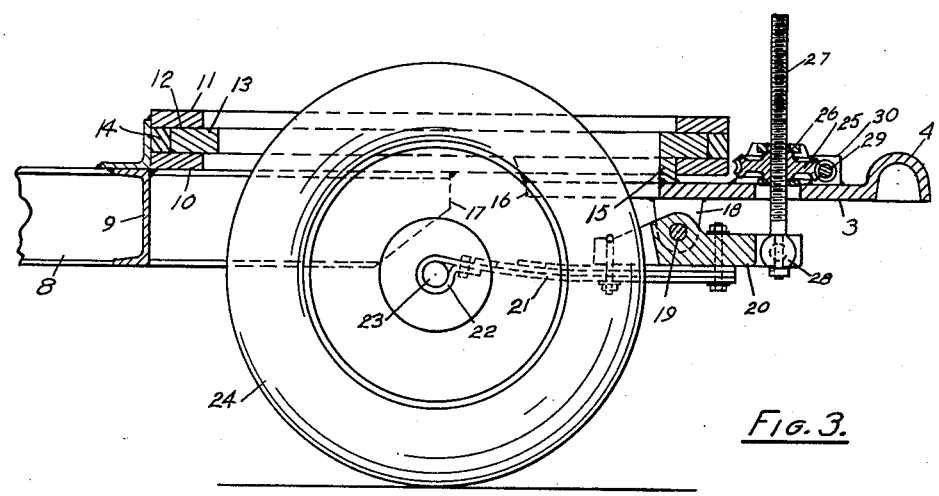

2 circles 10 and 11, as shown in Fig. 3, are welded to the front cross member 9 so as to provide a rigid front end construction for the frame. The circles 10 and 11 are fixed to a spacing circle 14 providing a guide surface for the edge of the circle 13. At the front of the circle 13 is a depending arcuate flange 15 welded to the upper surface of the triangular plate 3 forming the trailer hitch. Due to the length of the flange 15 the hitch is slightly spaced below the lower surface of the circle 10 and is supported for turning movement limited by engagement of the ends 16 of the hitch with the ends 17 of the side frames. On the under side of the hitch are spaced ears 18 receiving a pin 19 on which is pivoted a bracket 20 carrying spaced cantilever springs 21. The free ends of the cantilever springs are suitably clamped at 22 to the axle 23 of a full sized wheel 24. The diameter of the inner circle 13 is slightly greater than the diameter of the wheel 24 so that it is possible for the wheel to move up through the circle. This permits the use of a larger diameter wheel which is better adapted to road shocks.

The proportion of the weight carried by the wheel 24 is adjusted by a worm gear 25 journaled in a bracket 26 on the upper side of the hitch. The worm gear is threaded on a bolt 27 having a ball joint connection 28 to the front end of the bracket 20 and is turned by a worm 29 mounted in brackets 30 and turned by a hand crank 31. By turning the hand crank 31 the proportion of the weight carried by the wheel 24 can be adjusted so that an objectionable amount of weight will not be transmitted from the hitch to the towing automobile.

The mounting of the hitch is such that the wheel 24 is always moved in the direction to make the front end of the trailer follow the hitch. The sidewise displacement of the hitch, such as would take place when the trailer was going around a curve, displaces the wheel 24 in the opposite direction and lines the wheel in the direction to move the front end of the trailer in the direction of sidewise displacement of the hitch. The large diameter of the guide surfaces for the circle 13 makes any whipping substantially impossible.

When backing the trailer for parking, it will usually be advantageous to retract the wheel 24 so that the weight of the front end of the trailer is carried by the ball joint 4, 5. By dropping a pin through a hole 32 in circles 10, 11 and 13, the circles are locked against turning and the trailer can be backed in the conventional manner.

In hooking and unhooking the trailer, the wheel 24 is lowered until the weight is removed from the ball joint 4, 5.

What I claim as new is:

1. In a trailer, a circular guide at the front of the trailer, a hitch at the front of the guide for attaching the trailer to an automobile and having a part journaled in the guide whereby the hitch may pivot on a vertical axis relative to the trailer, cantilever springs on the hitch having free ends extending toward the center of the guide, a wheel carried by the free end of the spring and adapted to project up through the guide, and means adjusting the position of the springs relative to the hitch to determine the proportion of the trailer weight carried by the wheel.

2. In a trailer, a circular guide at the front of the trailer, a hitch at the front of the guide for attaching the trailer to an automobile and having a part journaled in the guide whereby the hitch may pivot on a vertical axis relative to the trailer, a wheel mounted on the hitch to pivot with the hitch and adapted to project up through the guide, and means adjusting the vertical position of the wheel relative to the hitch to determine the proportion of the trailer weight carried by the wheel.

JOHN A. CHISHOLM.

REFERENCES CITED

The following references are of record in the file of this patent:

UNITED STATES PATENTS

| Number | Name | Date |
| --- | --- | --- |
| 1,566,617 | Reid | Dec. 22, 1925 |
| 2,057,655 | Anthony et al. | Oct. 29, 1936 |
| 2,124,947 | Henderson | July 26, 1938 |
| 2,168,147 | Arehart | Aug. 1, 1939 |
| 2,376,001 | Nogle | May 15, 1945 |
| 2,411,009 | Slimp | Nov. 12, 1946 |